US010742541B2

United States Patent
Kim et al.

(10) Patent No.: US 10,742,541 B2
(45) Date of Patent: Aug. 11, 2020

(54) SYSTEMS AND METHODS FOR MULTI-PATH COMMUNICATION OVER MULTIPLE RADIO ACCESS TECHNOLOGIES

(71) Applicant: Alcatel-Lucent USA Inc., Murray Hill, NJ (US)

(72) Inventors: Bong Ho Kim, Morganville, NJ (US); Doru Calin, Manalapan, NJ (US); Jonathan Ling, North Brunswick, NJ (US); Harish Viswanathan, Morristown, NJ (US)

(73) Assignee: Nokia of America Corporation, Murray Hill, NJ (US)

( * ) Notice: Subject to any disclaimer, the term of this patent is extended or adjusted under 35 U.S.C. 154(b) by 88 days.

(21) Appl. No.: 15/219,794

(22) Filed: Jul. 26, 2016

(65) Prior Publication Data

US 2018/0034726 A1   Feb. 1, 2018

(51) Int. Cl.
*H04L 12/707* (2013.01)
*H04L 29/06* (2006.01)
(Continued)

(52) U.S. Cl.
CPC .............. *H04L 45/24* (2013.01); *H04L 69/04* (2013.01); *H04W 28/14* (2013.01); *H04W 76/16* (2018.02); *H04W 88/06* (2013.01); *H04W 88/16* (2013.01)

(58) Field of Classification Search
CPC ..... H04W 88/06; H04W 36/30; H04W 36/14; H04W 48/18; H04W 74/0833;
(Continued)

(56) References Cited

U.S. PATENT DOCUMENTS

| 2014/0169330 A1* | 6/2014 | Rommer | H04W 36/08 |
| | | | 370/331 |
| 2014/0287769 A1* | 9/2014 | Taori | H04W 74/0808 |
| | | | 455/450 |

(Continued)

FOREIGN PATENT DOCUMENTS

| EP | 2750461 A1 | 7/2014 |
| WO | WO-2015/047237 A1 | 4/2015 |

OTHER PUBLICATIONS

International Search Report and Written Opinion for Application No. PCT/US2017/042299 dated Nov. 23, 2017.
(Continued)

*Primary Examiner* — Romani Ohri
(74) *Attorney, Agent, or Firm* — Harness, Dickey & Pierce, P.L.C.

(57) ABSTRACT

In an example embodiment, a device includes a memory having computer-readable instruction stored therein and a processor. The processor is configured to execute the computer-readable instructions to identify a plurality of communication paths for data transmission between the device and a network gateway, a first one of the plurality of communication paths being associated with a first radio access technology and a second one of the plurality of communication paths being associated with a second radio access technology, and establish a data transmission session between the device and the network gateway simultaneously over at least the first one and the second one of the plurality of communication paths.

18 Claims, 10 Drawing Sheets

(51) Int. Cl.
*H04W 28/14* (2009.01)
*H04W 76/16* (2018.01)
*H04W 88/06* (2009.01)
*H04W 88/16* (2009.01)

(58) Field of Classification Search
CPC . H04W 28/0263; H04W 28/06; H04W 28/10; H04W 52/34; H04W 52/46; H04W 76/041; H04W 80/04; H04W 84/18; H04W 88/182
See application file for complete search history.

(56) References Cited

U.S. PATENT DOCUMENTS

| | | | |
|---|---|---|---|
| 2015/0270882 A1 | 9/2015 | Shattil | |
| 2016/0057658 A1* | 2/2016 | Horn | H04L 47/801 370/236 |
| 2016/0088542 A1* | 3/2016 | Belghoul | H04W 28/0268 370/331 |
| 2016/0112239 A1 | 4/2016 | Kanugovi et al. | |
| 2016/0212755 A1 | 7/2016 | Cao et al. | |
| 2017/0104717 A1* | 4/2017 | Vesterinen | H04W 8/26 |
| 2017/0223148 A1* | 8/2017 | Roeland | H04L 12/66 |
| 2018/0014346 A1* | 1/2018 | Gupta | H04W 76/026 |
| 2018/0041925 A1* | 2/2018 | Yilmaz | H04W 36/0033 |
| 2018/0199394 A1* | 7/2018 | Teyeb | H04W 76/16 |

OTHER PUBLICATIONS

International Preliminary Report on Patentability and Written Opinion dated Jan. 29, 2019 issued in International Application No. PCT/US2017/042299.
Korean Office Action dated Mar. 23, 2020 issued in Korean Patent Application No. 10-2019-7002512.

* cited by examiner

SYSTEMS AND METHODS FOR MULTI-PATH COMMUNICATION OVER MULTIPLE RADIO ACCESS TECHNOLOGIES

BACKGROUND

There are Multiple Radio Access Technologies (M-RAT), such as Wi-Fi, Bluetooth and cellular wireless technologies (e.g., 3G, 4G Long Term Evolution (LTE)), which often coexist and provide complementary wireless services to users. Many devices such as smartphones and laptops are capable of connecting simultaneously at radio level to multiple RATS.

Currently, when a device that is M-RAT capable is using two different data services (e.g., voice communication and an instant messaging service or an instant messaging service and a online gaming application), such devices are capable of using one of the available M-RATs to enable one of the two different data services, while using another one of the available M-RATs to enable the other one of the two different data services.

Furthermore, existing multi-path solutions are limited to certain applications with a fixed configuration and do not support many well-known applications.

SUMMARY

In an example embodiment, a device includes a memory having computer-readable instruction stored therein and a processor. The processor is configured to execute the computer-readable instructions to identify a plurality of communication paths for data transmission between the device and a network gateway, a first one of the plurality of communication paths being associated with a first radio access technology and a second one of the plurality of communication paths being associated with a second radio access technology, and establish a data transmission session between the device and the network gateway simultaneously over at least the first one and the second one of the plurality of communication paths.

In yet another example embodiment, the data transmission session is associated with a single data service for the device.

In yet another example embodiment, the processor is configured to execute the computer-readable instructions to identify the plurality of communication paths by transmitting a message to at least one intermediate network node via the first one of the plurality of communication paths, and receiving an identification message from the at least one intermediate network node identifying one or more communication paths, including the second one of the plurality of communication paths, available to the at least one intermediary network node, the first communication path and the one or more communication paths forming the plurality of communication paths.

In yet another example embodiment, the processor is configured to execute the computer-readable instructions to broadcast the message during a dynamic host configuration process upon activation of the device.

In yet another example embodiment, the processor is configured to execute the computer-readable instructions to establish the data communication session by transmitting an add interface message to the network gateway identifying for the network gateway, the one or more identified communication paths of the plurality of communication paths, at least one of receiving during a downlink transmission, and transmitting during an uplink transmission, data packets each including a different portion of data associated with the data transmission session over each of the plurality of communication paths.

In yet another example embodiment, during the downlink transmission of the data packets, the processor is configured to execute the computer-readable instructions to aggregate the received data packets to reconstruct the data, and decompress protocol headers in the aggregated data packets, the protocol headers having been compressed at the network gateway prior to transmission over the plurality of communication paths to the device, the compression and decompression of the protocol headers in the data packets being based on Robust Header Compression.

In yet another example embodiment, during the uplink transmission of the data packets, the processor is configured to execute the computer readable instructions to compress protocol headers in data packets to be transmitted to the network gateway, the compressed protocol headers being decompressed at the network gateway upon receipt, the compression and decompression of the protocol headers in the data packets being based on Robust Header Compression.

In yet another example embodiment, the add interface message is transmitted to the network gateway via the at least one intermediate network node and a corresponding base station associated with one of the at least two different radio access technologies.

In yet another example embodiment, the processor is configured to execute the computer-readable instructions to identify the plurality of communication paths by transmitting a first add interface message to at least one intermediate network node for the at least one intermediate network node to forward the first add interface message to the network gateway over a default communication path associated with the at least one intermediate network node, the first add interface message identifying the default communication path for the network gateway, receiving a response message from the at least one intermediate network node, the response message identifying at least one additional communication path associated with the at least one intermediate network node, and transmitting a second add interface message to the at least one intermediate network node for the at least one intermediate network node to forward the second add interface message to the network gateway, the second add interface message identifying the at least one additional communication path for the network gateway.

In yet another example embodiment, the processor is configured to execute the computer-readable instructions to establish data communication between the device and the network gateway via the first communication path associated with the device, prior to transmitting the first add interface message, and the first communication path, the default communication path and the at least one additional communication path form the plurality of communication paths.

In yet another example embodiment, the processor is configured to execute the computer-readable instructions to establish the data communication session by at least one of receiving during a downlink transmission, and transmitting during an uplink transmission, data packets each including a different portion of data associated with the data transmission session over each of the plurality of communication paths.

In yet another example embodiment, during the downlink transmission of the data packets, the processor is configured to execute the computer-readable instructions to aggregate the received data packets to reconstruct the data, and decompress protocol headers in the aggregated data packets, the protocol headers having been compressed at the network gateway prior to transmission over the plurality of communication paths to the device, the compression and decompression of the protocol headers in the data packets being based on. Robust Header Compression.

In yet another example embodiment, during the uplink transmission of the data packets, the processor is configured to execute the computer readable instructions to compress protocol headers in data packets to he transmitted to the network gateway, the compressed protocol headers being decompressed at the network gateway upon receipt, the compression and decompression of the protocol headers in the data packets being based on Robust Header Compression.

In yet another example embodiment, the processor is configured to execute the computer-readable instructions to identify the plurality of communication paths by broadcasting at least one discovery message, and receiving at least one response to the at least one discovery message with information about available communication paths, the available communication paths and at least one dedicated communication path associated with the device forming the plurality of communication paths.

In an example embodiment, a device includes a memory having computer-readable instruction stored therein, and a processor. The processor is configured to execute the computer-readable instructions to establish a plurality of communication paths for data transmission between a user equipment (UE) and a network gateway, and establish a data transmission session between the UE and the network gateway simultaneously over the plurality of communication paths.

In yet another example embodiment, the processor is configured to execute the computer-readable instructions to receive a message from the UE, the message being a request by the UE to establish a communication path to the network gateway via the device, create a number of copies of the received message, the number of copies corresponding to a number of communication paths available between the device and the network gateway, each of the copies being a modified version of the message having an IP address of one of the number of communication paths, and transmitting each of the number of copies to the network gateway in order to establish the plurality of communication paths for the data transmission between the UE and the network gateway.

In yet another example embodiment, the processor is configured to execute the computer-readable instructions to establish the data transmission session by receiving a different portion of the data via each of the established plurality of communication paths from the network gateway, each different portion having been compressed at the network gateway, aggregating the received portions of the data, and transmitting the aggregated portions to the UE.

In yet another example embodiment, the UE is configured to operate according to one radio access technology, and the processor is configured to execute the computer-readable instructions to receive a data packet from the UE, transmit a number of add interface messages to the network gateway, the number of add interface messages corresponding to a number of the plurality of communication paths between the device and the network gateway, and establish the plurality of communication paths upon reception of the number of add interface messages by the network gateway.

In yet another example embodiment, the processor is configured to execute the computer-readable instructions to establish the data transmission session by receive a different portion of the data via each of the plurality of communication paths, perform data packet aggregation on the received different portions to reconstruct the data, and transmit the reconstructed data to the UE.

In yet another example embodiment, at least a first one of the plurality of communication paths is associated with a first technology according to which the UE communicates with the network gateway, and at least a second one of the plurality of communication paths is associated with a second technology according to which the UE communicates with the network gateway.

Inventive concepts and example embodiments are not limited to that recited in the device claims presented herein but may also be related to corresponding method(s), system (s) and/or computer-readable medium.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
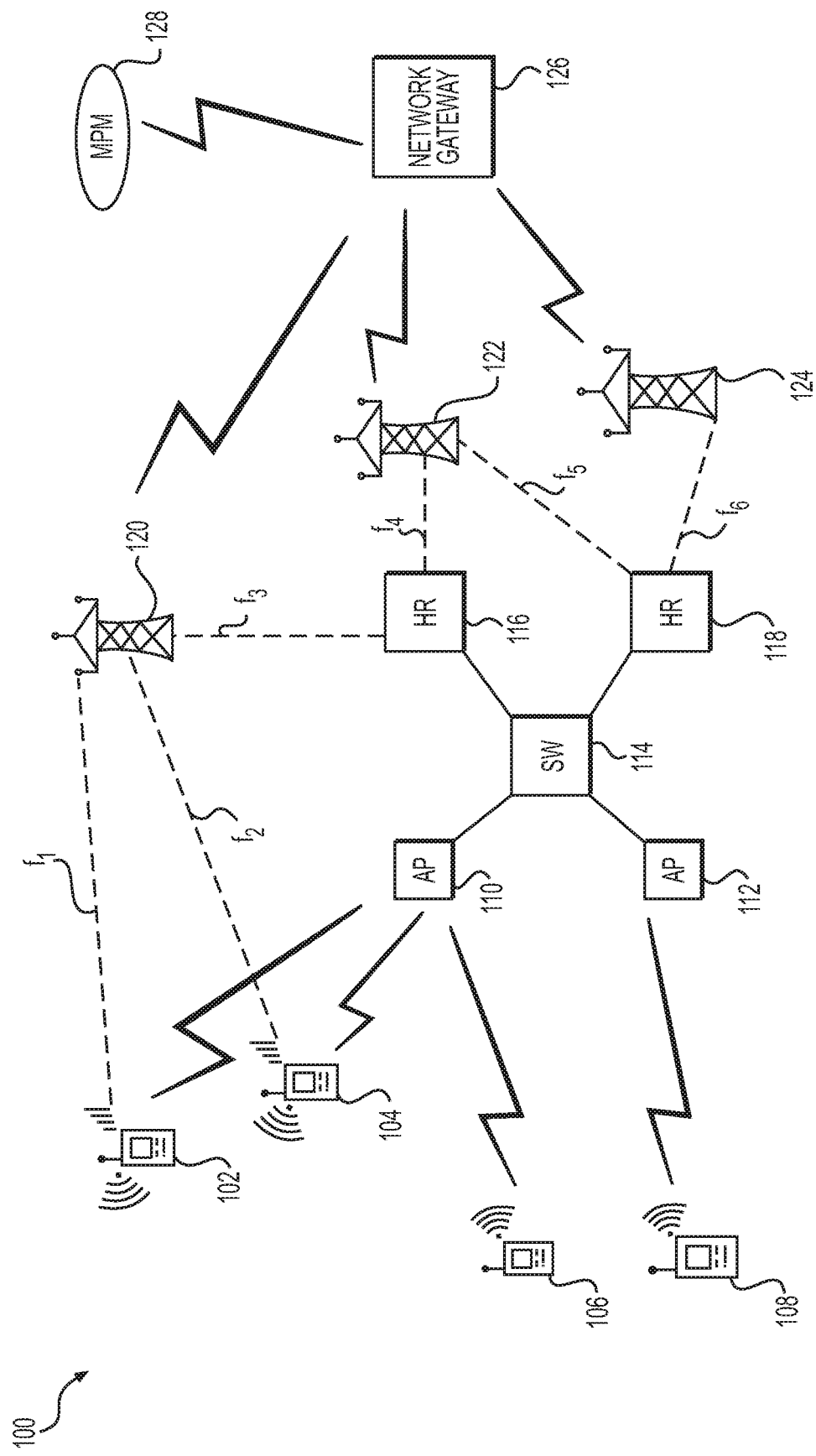
FIG. 1 illustrates a wireless communication system, according to an example embodiment.

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will he described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may he terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may he implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment ay represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with Radio Access Networks (RANs) such as: Universal Mobile Telecommunications System (UMTS); Global System for Mobile communications (GSM); Advance Mobile Phone Service (AMPS) system; the Narrowband AMPS system (NAMPS); the Total. Access Communications System (TACS); the Personal. Digital Cellular (PDC) system;

the United States Digital Cellular (USDC) system; the code division multiple access (CDMA) system described in EIA/TIA IS-95; a High Rate Packet Data (HRPD) system, Worldwide Interoperability for Microwave Access (Wi-MAX); Ultra Mobile Broadband (UMB); and $3^{rd}$ Generation Partnership Project LTE (3GPP LTE).

As discussed in the Background. Section, currently deployed multiple radio access technologies (M-RATS) enabled devices are not capable of fully utilizing the M-RATs to service single and/or multiple data sessions.

To take full advantage of such M-RATs, there is a need for an advanced network protocol level mechansim so that whenever possible or necessary to support and maintain a targeted Quality of Service (QoS) level for a single data service a targeted data rate and/or a targeted packet delivery delay), a traffic flow corresponding to the single data service may be split into multiple simultaneous traffic flows over the M-RATs. Such flow splitting may be beneficial, for instance, when there is no single RAT that is able to satisfy the QoS requirements of a traffic flow alone (e.g., due to the lack of sufficient available bandwidth to support the traffic flow). Accordingly, in such situations, by splitting the said traffic flow across M-RATs, sufficient bandwidth may be achieved through aggregation of the split flows in order to meet the QoS requirements of the said traffic flow.

The mechanism includes the necessary protocol support that enables harvesting all the available resources of a M-RAT environment to fullfill the QoS requirements of at least one application. Hereinafter, example embodiments describing such mechanism will be described.

FIG. 1 illustrates a wireless communication system, according to an example embodiment. As shown in FIG. 1, a communication system 100 includes user equipment (UEs) 102, 104, 106 and 108, access points (APs) 110 and 112, a switch 114, home routers (HRs) 116 and 118, base stations (BSs) 120, 122 and 124 as well as the network gateway 126. In one example embodiment, the communication system 100 further includes a multi-path-manager MPM 128, which will be further described with reference to FIG. 2. In one example embodiment, the communication system 100 is made up of two different RAT networks. First one of the two different RAT networks is a Wi-Fi home network, which the UEs 102, 104, 106 and 108, the APs 110 and 112, the HRs 116 and 118 are part of. A second one of the two different RAT networks is a cellular wireless access network such as, but not limited to, a 3G wireless access network, a 4G-Long Term Evolution (LTE) network, a next generation (e.g., 5G) wireless network etc. The second one of the two different RAT networks includes the UEs 102, 104, 106 and 108, the BSs 120, 122 and 124 and the network gateway 126.

While the wireless communication system 100 is shown as including the above-described two different RAT networks, example embodiments are not limited thereto and the wireless communication system 100 may include any number of different RAT networks such as Bluetooth, 3G, 4G, 5G etc.

Each of the UEs 102, 104, 106 and 108 may be any one of, but not limited to, a mobile device, a tablet, a laptop computer, a desk top computer and/or any other type of stationary or portable device capable of establishing communication via one or more RATs to the Internet and/or other devices. Each of the UEs 102, 104, 106 and 108 may have a built-in M-RAT capability, which enables each of the UEs 102, 104, 106 and 108 to operate according to two or more radio access technologies (e.g., Wi-Fi and 4G-LTE). However, example embodiments are not limited to UEs with built-in M-RAT capability and may include UEs that are configured to operate using a single RAT.

While in FIG. 1 only UEs 102 and 104 are shown as being M-RAT enabled (using both the Wi-Fi symbol as well as bar symbols for wireless communication based on for example 4G-LTE) and UEs 106 and 108 are shown as being only Wi-Fi enabled, example embodiments are not limited thereto. Any one or more of the UEs 102, 104, 106 and 108 may be M-RAT enabled.

Furthermore, while FIG. 1 illustrates only four UEs 102, 104, 106 and 108, a number of UEs in the communication system 100 is not limited thereto and may include any number of UEs that are the same or different from the UEs 102, 104, 106 and 108, as described above.

The communications system 100 further includes the AP 110, the AP 112, the switch 114 (which may be an Ethernet switch), the HR 116 and the HR 118. Each of the APs 110 and 112, the switch 114 and the HRs 116 and 118 may be any corresponding known or to he developed device that operates within, for example, a home wireless access network such as a Wi-Fi network according to any known or to be developed methods. The number of APs, the switch and the HRs shown in FIG. 1 are non-limiting and may vary according to the size of the home network, the number of UEs served in the home network, etc.

In one example embodiment, the APs 110 and 112 communicate with the HRs 116 and 118 via the switch 114. Furthermore, in one example embodiment, the UEs 102, 104, 106 and 108 communicate with the HRs 116 and 118 via the APs 110 and 112 and the switch 114. While in FIG. 1, UEs 102, 104 and 106 are shown as communicating with AP 110 and UE 108 is shown as communicating with the AP 112, example embodiments are not limited thereto and any of the UEs 102, 104, 106 and 108 may communicate with any of the HRs 116 and 118, via any of the APs 110 and 112.

The communication system 100 further includes one or more base stations such as BSs 120, 122 and 124. The BSs 120, 122 and 124 may operate according to the underlying cellular wireless access technology. For example, if the UEs 102, 104, 106 and 108 are 4G-LTE enabled devices, then the BSs 120, 122 and 124 are e-NodeBs (eNB) and or other LTE-based small cell base stations.

In one example embodiment, the HRs 116 and 118 communicate with one or more of the BSs 120, 122 and 124 for further communication and transmission of data to and from the network gateway 126.

In one example embodiment, not all of the UEs 102, 104, 106 and 108 operate on the same underlying cellular wireless access technology. For example, UE 102 may be a 4G-LTE enabled device while UE 104 is a 3G or CDMA enabled device. Accordingly, UEs 102 and 104 may not communicate directly with BS 120 shown in FIG. 1 because BS 120 is not capable of servicing different cellular wireless access technologies. Accordingly, BS 122 may be associated with 3G or CDMA cellular wireless access technology and the UE 104 may communicate therewith.

The communication system 100 further includes the network gateway 126, which as is known in the art, facilitates the communication of UEs 102, 104, 106 and 108 with other devices, entities over the Internet.

Furthermore, six data communication paths f1-f6 are shown in FIG. 1. In one example embodiment, f1 is a data communication path dedicated to UE 102 and enables the UE 102 to communicate with the BS 120 over the cellular wireless access technology, according to which the UE 102 operates. Similarly, f2 is a data communication path dedicated to UE 104 and enables the UE 104 to communicate with the BS 120 over the cellular wireless access technology, according to which the UE 104 operates.

In one example embodiment, f3-f6 present alternative data communication paths available via the home network and the HRs 116 and 118 for utilization by the UEs 102, 104, 106 and 108 for communication with the network gateway. The data communication paths f1-f6 will be further described and utilized below.

While certain components of the home network and the cellular wireless network are shown as part of the communication system 100, example embodiments are not limited thereto. Each of the home network and the cellular wireless access network may include components other than that shown in FIG. 1, which are necessary and/or beneficial for operation of the underlying networks within the communication system 100.

Generic Routing Encapsulation (GRE) is a tunneling protocol that provides end to end (point to point) links over a network between two end points such as one of the UEs 102, 104, 106 and 108, the HRs 116 and 118, and the network gateway 126. In example embodiments described herein, GRE is based on RFC 1701/2784/2890 with Key and Sequence number option fields set to 1.

Furthermore and in one example embodiment, there may be multiple GRE Keys per UE allowing for dynamic management (establish/tear down events) of multiple parallel GRE tunnels, where a specific GRE tunnel may support differentiated QoS requirements for a targeted data service. In such case, flows may be mapped to QoS classes, and the classes may be associated with a key.

Figure 2A:
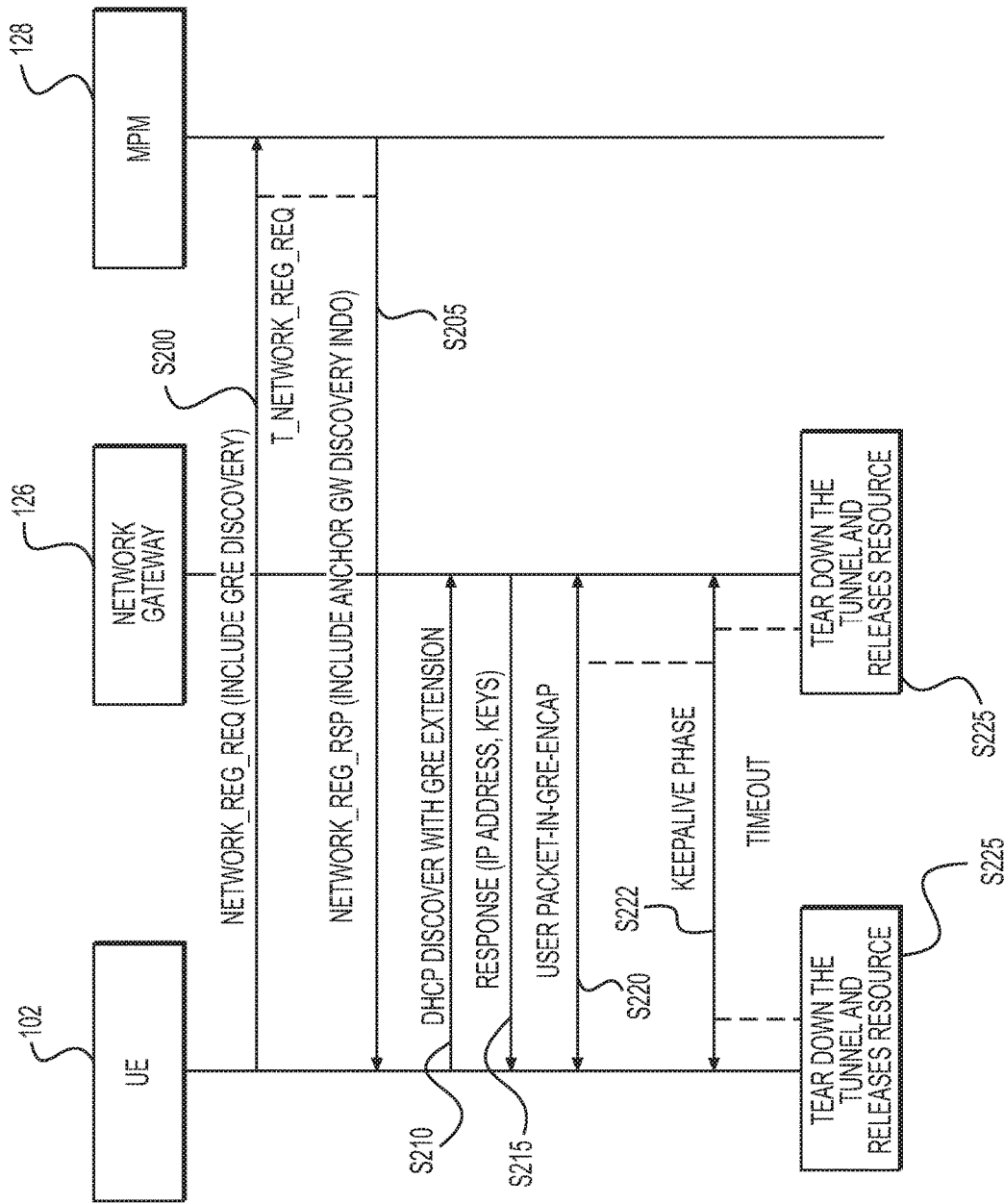
FIG. 2A is a call flow illustrating a process of establishing a generic routing encapsulation tunnel, according to an example embodiment.
Figure 2B:
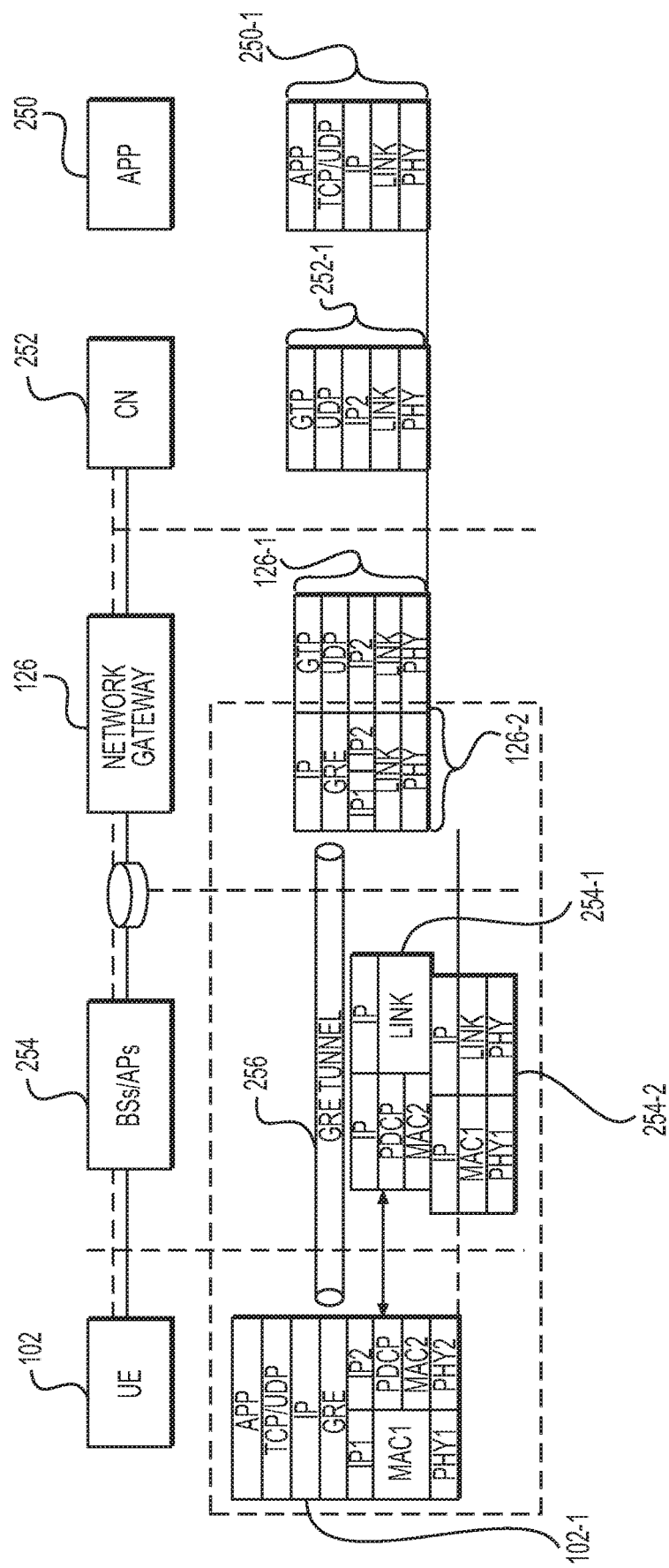
FIG. 2B illustrates a protocol layer architecture for supporting multiple data communication paths via M-RATs using GRE tunneling, according to an example embodiment.

In one example embodiment, a GRE tunnel may be established as shown in FIGS. 2A and 2B. FIG. 2A is a call flow illustrating a process of establishing a generic routing encapsulation tunnel, according to an example embodiment.

At S200 and as part of initiating a connection to a network, the UE 102 transmits a network registration request message that includes a GRE discovery to the MPM 128 shown in FIG. 1. In one example embodiment, the UE 102 may transmit the network registration request message to a policy server or a Domain Name System (DNS), instead of the MPM 128.

At S205, the UE 102 receives a network registration response from the MPM 128, which includes identification of the network gateway 126.

At S210, the UE 102 sends a DHCP discovery message with a GRE extension to the network gateway 126.

At S215 and after a subscriber authentication process, the UE 102 receives a message from the network gateway 126 with the GRE tunnel end point IP address and an associated GRE key. Thereafter, the GRE tunnel is established.

In one example embodiment, depending on the number of service classes to be supported, multiple GRE Keys may be delivered to the UE 102 (via, for example, a "Response (IP address, Keys)" message). In one example embodiment, if a Software Defined Network (SDN) approach to mobile core is used and a controller handles the gateway resources, the controller may provide the GRE tunnel end point address and keys to the UE 102.

At S220, the UE 102 exchanges data packets with the network gateway 126 using the GRE tunnel (e.g., data packets are encapsulated in the established GRE tunnel). In one example embodiment, the exchange of data packets keeps the GRE tunnel "alive."

In one example embodiment, when the UE 102 forwards the GRE encapsulated traffic to the network gateway 126, the network gateway 126 recognizes whether it is a first occurrence of a new GRE tunnel between the UE 102 and the network gateway 126. If the network gateway 126 determines that it is the first occurrence of a new GRE tunnel, the network gateway 126 prepares resources to handle a new GRE tunnel. In one example embodiment, the network gateway 126 learns the information about the new GRE tunnel set up and uses the same to direct the corresponding traffic to the UE 102 through the said new GRE tunnel.

In one example embodiment and in the absence of data packets being exchanged between the UE 102 and the network gateway 126, at S222, the UE 102 exchanges "keep alive" messages with the network gateway 126 in order to keep the GRE tunnel(s) active.

Thereafter, at S225, the UE 102 (and/or the network gateway 126) tears down the GRE tunnel and release network resources. In one example, the UE 102 (and/or the network gateway 126) tears down the GRE tunnel and release network resources after a timeout period during which no data packets is exchanged between the UE 102 and the network gateway 126. The duration of the timeout period may be adjustable and determined based on empirical studies and/or experiments.

FIG. 2B illustrates a protocol layer architecture for supporting multiple data communication paths via M-RATS using GRE tunneling, according to an example embodiment.

As shown in FIG. 2B, a data service may be established between two nodes (e.g., the UE 102 and an application server 250). Corresponding data packets may be transmitted between the UE 102 and the application server 250 via one or more intermediate nodes (e.g., a core network (CN) 252, the network gateway 126 and the BSs/APs 254). The BSs/APs 254 in FIG. 2B may be any one or more of the HRs 116 and 118 as well as the BSs 120, 122 and 124 of FIG. 1.

The protocol layer architectures, as known in the art and supported at each of the nodes 102, 126, 250, 252 and 254, are shown in FIG. 2B. For example, the protocol layer architecture 102-1 is supported at the UE 102, the protocol layer architectures 126-1 (network side) and 126-2 (UE side) are supported at the network gateway 126, the protocol layer architecture 250-1 is supported at the application server 250 and the protocol layer architecture 252-1 is supported at the CN 252. Furthermore, the protocol layer architecture 254-1 (corresponding to one RAT (e.g., cellular wireless access technology)) and the protocol layer architecture 254-2 (corresponding to another RAT (e.g., WiFi radio access technology)) are supported at the BSs/APs 254.

When such data service is established, a GRE tunnel 256 may be established between the UE 102 and the network gateway 126. In one example embodiment, the protocol layer architecture 254-1 supports Packet Data Convergence Protocol (PDCP) as defined in the Third Generation Partnership Project (3GPP), while the protocol layer architecture 254-2 does not have a PDCP layer. However, according to example embodiments described herein, the GRE tunnel 126 end points in the UE 102 and the network gateway 126, which allows the GRE tunnel 256 to be split over multiple RATs, allowing in turn dowlink (DL) traffic aggregation at the UE 102. In a similar manner, for the Uplink (UL) traffic, the traffic flowing through separate RATs is aggregated at the network gateway 126.

As part of the process of establishing a GRE tunnel between a UE and a network gateway, example embodiments will be described hereinafter, according to which multiple data communication paths may be identified and utilized for establishing a data communication path between a UE and the network gateway. In one example embodiment, each data communication may be established by one or more of the UEs 102, 104, 106, and 108 and/or one or more of the HRs 116 and 188 by adding a network interface, as will be described below.

In one example embodiment, the two or more of the multiple data communication paths may be established over different RATs (e.g., Wi-Fi and 4G-LTE) and may be utilized to provide a single and/or multiple data service(s) in a given data communication session to the UE (e.g., a first one of the multiple data communication paths provide a portion of the data communication session over 4G-LTE and a second one of the multiple data communication paths provide a different portion of the data communication session of the Wi-Fi).

For example, the UE, which has M-RAT capability, may want to establish a video conferencing session (which may be an example of a data service session) over the internee. In one example embodiment, if a UE does not have M-RAT capability (e.g. UE 108 shown in FIG. 1) but a HR (e.g. HR 118 shown in FIG. 1), which communicates with the UE 108, has M-RAT capability, then the HR 118 may provide the M-RAT service (data transmission over the multiple data communication paths) between the UE 108 and the network gateway 126. In this case, the HR 118 provides the same service for the UE 108 as the UE 102 (which has M-RAT capability), as it will be described herein. Hereinafter, identification of multiple data communication paths between a UE and a network gateway, as part of establishing a GRE tunnel for communicating data, to and from a UE will be described.

Figure 3:
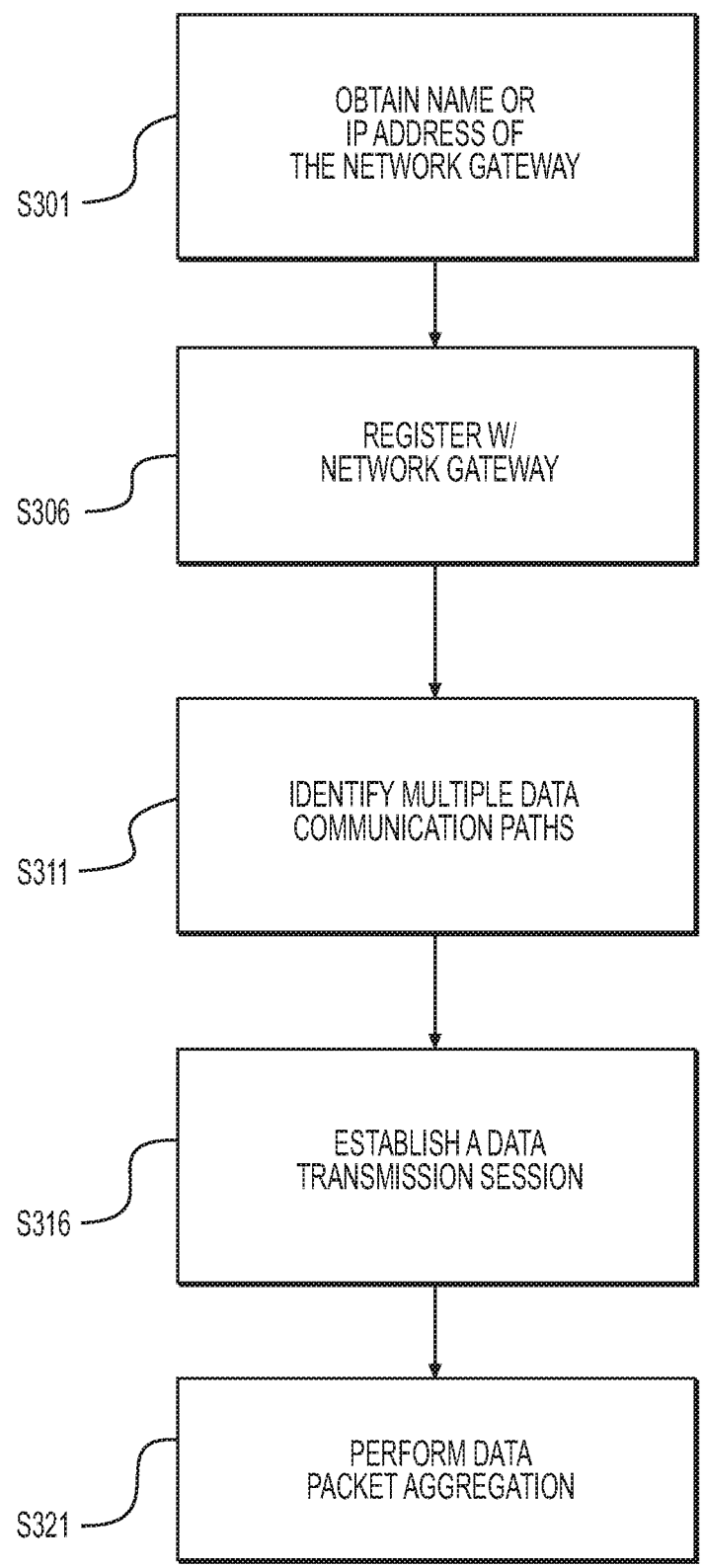
FIG. 3 illustrates a method for identifying data communication paths between a User Equipment (UE) and a network gateway, according to an example embodiment.

FIG. 3 illustrates a method for identifying data communication paths between a UE and a network gateway, according to an example embodiment. FIG. 3 will be described with reference to the UE 102 of FIG. 1. While the UE 102 is used for purposes of describing the method of claim 2, example embodiments are not limited thereto. FIG. 3 may be implemented with reference to any of the UEs 102, 104, 106 and 108.

With reference to FIGS. 1 and 2, at S301, the UE 102 obtains the name or IP address of the network gateway 126. In one example embodiment, the UE 102 obtains the IP address of the network gateway 126 via the network registration response message provided by the MPM 128 described above, in reference to FIG. 2.

At S306, the UE 102 registers with the network gateway 126, as described above, in reference to FIG. 2.

At S311, the UE 102 identifies multiple data communication paths, which may also be referred to as a plurality of data communication paths, (e.g., f1, f3, f4, f5 and f6, as it will be described below) to be used as part of the GRE tunnel between the UE 102 and the gateway 126 for establishing a data transmission session. Several different methods for identifying multiple data communication paths will be described with reference to FIGS. 4-8.

Upon identifying the multiple data communication paths, at S316, the UE 102 establishes a data transmission session for transmission of data between the UE 102 and the network gateway 126 over the identified multiple data communication paths. In one example embodiment, the UE 102 establishes the data transmission session as follows.

In one example embodiment, the UE 102 receives data packets from the network gateway 126 via the identified data communication paths and through the corresponding ones of the BSs 120, 122 and 124 and the corresponding ones of the HRs 116 and 118 as shown in FIG. 1. In one example embodiment, the network gateway 126, via the identified data communication paths, transmits data packets to the UE 102 via the HRs 116 and 118.

In another example embodiment and for cases in which the receiving UE (e.g., the UE 108) does not have M-RAT capability, the HR 118 is M-RAT capable and provides network connectivity to the UE 108, establishing multiple paths (i.e. f5 and f6) for the UE 108. When the HR 118 receives data packets from the network gateway 126 through data communication paths f5 and f6 that are associated with HR 118, the HR 118 aggregates the traffic and performs packet in-ordering. Thereafter it forwards the data packets as IP packets to the UE 108.

In another example embodiment and for cases in which the receiving UE (e.g., the UE 106) does not have M-RAT capability and establishes a single path via HR 116, but HR 116 establishes two path (i.e. f3 and f4) on behalf of the corresponding UE 106, when the HR 116 receives data packets from the network gaterway 126 through data communication paths f3 and f4 that are associated with HR 116, as will he described below, the HR 116 forwards the data packets as GRE packets to the UE 106, after setting the GRE tunnel destination IP address of the data packets as that of the UE 106. This process merges the two paths (f3 and f4) at the HR 116 from the network gateway 126 into a single path toward the UE 106. Furthermore, the FIR 116 implements the same process as described above with reference to HR 118, upon receiving data packets from the network gateway via the corresponding data communication paths (f5 and f6), for forwarding the data packets to the UE 106. Thereafter, the UE 106 performs data packet in-ordering, as it will be described below.

In another example embodiment and for cases in which the receiving UE (e.g., the UE 102) has M-RAT capability, then the HR 116 and/or the HR 118 simply forward the data packets from the network gateway 126 to the UE 102, so that the UE 102 performs merging packets from all paths and packet re-ordering as required by the application.

Thereafter, at S321, the UE 102 performs packet aggregation with respect to the different data packets received via the multiple data communication paths in order to reconstruct the received data. For example, the UE 102 may perform packet aggregation as follows.

In one example embodiment, the UE 102 de-capsulates the data packets received at the UE 102 and performs packet in-ordering procedure. In one example embodiment, the packet in-ordering may be performed per GRE (per key) basis. Thereafter, the UE 102 may route the packets internally at the IP layer.

Traditional transmissions rely on single flow and single RAT and often underutilize the available bandwidth. Depending on the Round Trip Time (RTT), network and UE specific conditions, the achievable throughput may be, for example, under 50% of the total peak capacity of a RAT (e.g., for a RAT with a peak rate of 100 Mbps, the achievable throughput may be 50 Mbps). This may he referred to as a reference baseline.

With N (N being an integer greater than 1) RATs and network/UE conditions which cap the achievable user rate, the rate gains enabled through dynamic IP aggregation across the N RATs may increase in an order M compared to the reference baseline, since we may enable M simultaneous flows (M of the f1 through f6 data communication paths).

In one example embodiment, a Multi-Path Manager (MPM) 128 may be running on top of a wireless network such as the cellular wireless network of FIG. 1 arid may be responsible for selecting one or more of the identified data communication paths for a traffic flow in the system 100.

Upon establishment of a single GRE tunnel per data service flow between the network gateway 126 and the UE 102, with an IP address for the UE 102 assigned by the network gateway 126, the MPM may use bandwidth and packet delay reports to set fractions $f_1, \ldots, f_M$ (e.g., sends data in blocks, for instance on the shortest packet delay path first), where a fraction $f_i$ refers to the data chunks sent over the i-th path; M is the total number of available data communication paths between the UE 102 and the network gateway 126 (which according to FIG. 1, equals to 5 data communication paths f1, f3, f4, f5 and f6). The MPM may also be responsible to add or remove a path from the set of active paths for a scheduler of the network gateway 126 based on factors such as performance monitoring results and the traffic split/aggregation policy.

Thereafter, the MPM may set a reorder buffer size large enough to hold a number of data packets with a combined volume that is equivalent to the incoming data rate from all M paths times the packet in-ordering timeout (T). In one example embodiment, the timeout (T) is set to:

Min(packet delay budget based on service performance requirement, Max(alpha,max((avg(Delay$_1$)+(beta*var(Delay$_1$))), . . . , (avg(Delay$_M$)+(beta*var(Delay$_M$))))) where "alpha" is an initial value before the packet delay is measured and "beta" is to absorb the delay variations and is preferably set to be larger than one.

Thereafter, the UE 102 may perform packet in-ordering on the packets held in the buffer size based on, for example, GRE sequence numbers included in each packet. In one example embodiment, the UE 102 may pass all in-sequence data up the IP layer. If the UE 102 detects out-of-order packets, the UE 102 may wait for a period of time equal to T, as described above, before re-performing packet in-ordering.

Hereinafter, FIGS. 4-8 describe various example embodiments for identifying a plurality of data communication paths between the UE 102 and the network gateway 126.

Figure 4:
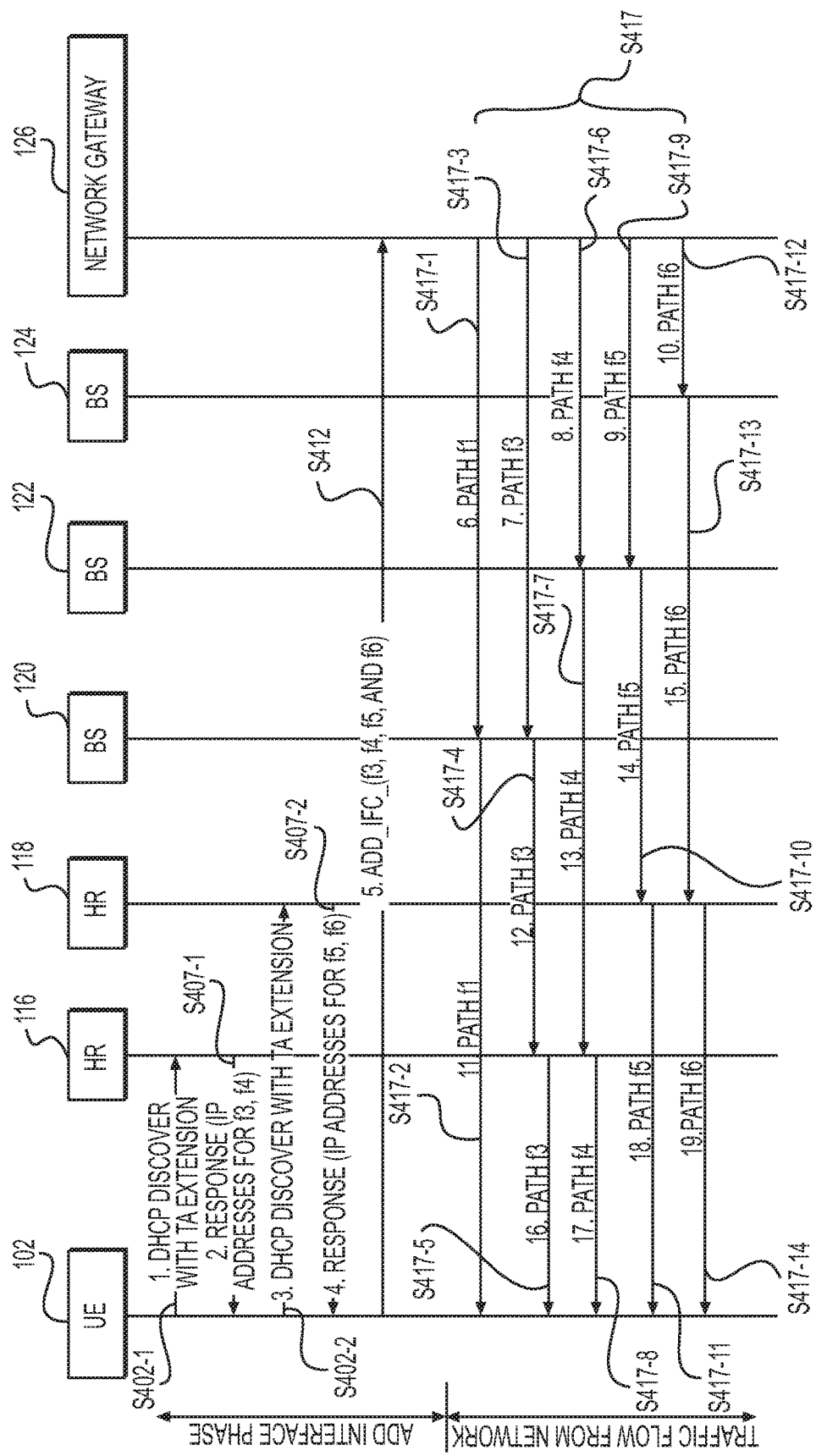
FIG. 4 is a call flow illustrating a method for identifying data communication paths between a M-RAT capable UE and a network gateway, according to an example embodiment.

FIG. 4 is a call flow illustrating a method for identifying data communication paths between a M-RAT capable UE and a network gateway, according to an example embodiment. With reference to FIG. 4, the UE 102 is M-RAT capable and performs network interface discovery and addition in order to add available data communication paths. FIG. 4 will be described below with reference to FIGS. 1-3.

As can be seen from FIG. 4, the process of FIG. 4 is divided into an add interface phase and a traffic flow phase. In one example embodiment, the process of identifying the data communication paths is performed during the add interface phase while the traffic flow is performed during the traffic flow phase.

During the add interface phase, at S402-1, the UE 102 transmits a message to the HR 116. Similarly and in one example embodiment, at S402-2, the UE 102 transmits a message to the HR 118. In one example embodiment, S402-1 and 402-2 may collectively he referred to as S402. In one example embodiment, the UE 102 transmits the message upon activation and initiation of a DHCP with the HRs 116 and 118. The message may inform the HRs 116 and 118 about the UE 102's throughput aggregation capacity (i.e., that the UE 102 is capable of operation on multiple RATs).

In one example embodiment, if the UE 102 does not have an aggregation capacity (M-RAT capability), similar to the UE 108 shown in FIG. 1, the HRs 116 and 118 simply respond to the UE 102 with an IP address as part of the DHCP process. In such case, and as it will he described below with reference to FIG. 8, the HRs 116 and 118 may provide the M-RAT aggregation capacity to such UE 102.

At S407-1, the UE 102 receives a response (identification message) from the HR 116. Similarly and in one example embodiment, the UE 102 also receives a response (identification message) from the HR 118 at S407-2. In one example embodiment, S407-1 and S407-2 may collectively he referred to as S407. The response from each of the HRs 116 and 118 may be an identification message. Each identification message identifies for the UE 102 one or more IP addresses associated with data communication paths available to each of the HRs 116 and 118.

As shown in FIG. 1, data communication paths f3 and f4 are available to the HR 116 while data communication paths f5 and f6 are available to the HR 118. Accordingly, the response from HR 116 to the UE 102 includes two IP addresses for the data communication paths f3 and f4 while the response from the HR 118 to the UE 102 includes two IP addresses for the data communication paths f5 and f6.

Once the UE 102 receives the IP addresses for data communication paths f3, f4, f5 and f6 from the HRs 116 and 118, the UE 102 will have five data communication paths available thereto. The five data communication paths include f1 (a dedicated data communication path for the UE 102 over one of the multiple RATs (e.g., the 4G-LTE RAT) as well as f3, f4, f5 and f6 available to the UE 102 via another one of the multiple RATs (e.g., the Wi-Fi RAT).

By performing S402 and S407, the UE 102 identifies the plurality of data communication paths available to the UE 102 through which the UE 102 may exchange data with the network gateway 126.

At S412, the UE 102 transmits an "add interface" message on each of the identified data communication paths (f3, f4, f5 and f6) to the network gateway 126. In one example embodiment, the UE 102 does not transmit an "add interface" message on the dedicated data communication path f1, because the data communication path f1 is already known to the network gateway 126 as being available for communication with the UE 102 (e.g., as part of the initial registration of the UE with the network gateway 126, as described with reference to S301 and S306).

Thereafter, the BSs 120, 122 and 124 forward the messages received from the HRs 116 and 118 to the network gateway 126. Upon receiving the messages, the network gateway 126 adds f3, f4, f5 and f6 as available data communication paths for the UE 102.

Thereafter, at S417, the process reverts back to S316 of FIG. 3 and S316 and S321 will be repeated.

FIG. 4 illustrates an example of establishing a data communication session at S316, via f1, f3, f4, f5 and f6 during the traffic flow phase.

At S417-1 the network gateway 126 transmits one or more data packets via path f1 to the BS 120. The BS 120 then transmits the received data packets via path f1 to the UE 102 at S417-2. Similarly, at S417-3 the network gateway 126 transmits one or more data packets via path f3 to the BS 120. The BS 120 then transmits the received one or more data packets via path f3 to the HR 116 at S417-4. The HR 116 then transmits the received one or more data packets via path f3 to the UE 102 at S417-5.

Similarly, at S417-6 the network gateway 126 transmits one or more data packets via path f4 to the BS 122. The BS 122 then transmits the received one or more data packets via path f4 to the HR 116 at S417-7. The HR 116 then transmits the received one or more data packets via path f4 to the UE 102 at S417-8.

Similarly, at S417-9 the network gateway 126 transmits one or more data packets via path f5 to the BS 122. The BS 122 then transmits the received one or more data packets via path f5 to the HR 118 at S417-10. The HR 118 then transmits the received one or more data packets via path f5 to the UE 102 at S417-11.

Similarly, at S417-12 the network gateway 126 transmits one or more data packets via path f6 to the BS 124. The BS 124 then transmits the received one or more data packets via path f6 to the HR 118 at S417-13. The HR 118 then transmits the received one or more data packets via path f6 to the UE 102 at S417-14.

Figure 5:
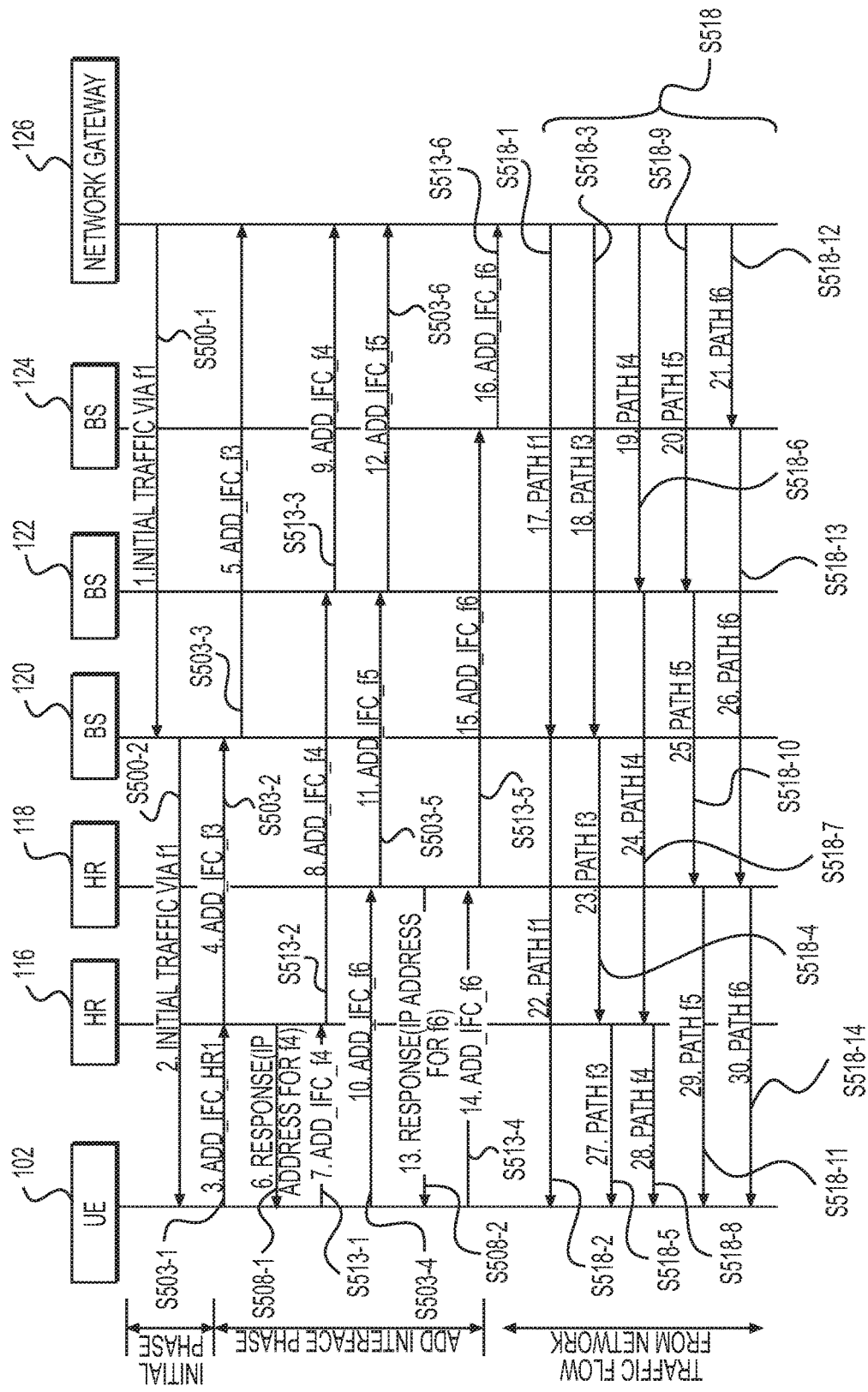
FIG. 5 is a call flow illustrating a method for identifying data communication paths between a M-RAT capable UE, supported by a M-RAT proxy for data communication path discovery and a network gateway, according to an example embodiment.

FIG. 5 is a call flow illustrating a method for identifying data communication paths between a M-RAT capable UE, supported by a M-RAT proxy for data communication path discovery and a network gateway, according to an example embodiment. With reference to FIG. 5, the UE 102 is M-RAT capable supported by M-RAT capable HRs 116 and 118. The UE 102 performs network interface discovery and addition in order to add available data communication paths. FIG. 5 will be described below with reference to FIGS. 1-3.

As can be seen from FIG. 5, the process of FIG. 5 is divided into an initial phase, an add interface phase and a traffic flow phase. In one example embodiment, identifying the data communication paths is performed during the add interface phase while the traffic flow is performed during the traffic flow phase.

During the initial phase at S500-1 and S500-2, prior to the UE 102 utilizing its throughput aggregation capability, the UE 102 and the network gateway 126 communicate via the dedicated data communication path f1. For example, at S500-1 the network gateway 126 transmits one or more data packets to the BS 120 via path f1. The BS 120 then transmits the received one or more data packets to the UE 102 via path f1 at S500-2.

Thereafter and as part of the add interface phase, at S503-1, the UE 102 transmits an "add interface" message to the HR 116 (this may be referred to as the HR 116 "add interface" message). At S503-2, the HR 116 replaces the IP address of HR 116 in the received HR 116 "add interface" message with the IP address of the interface for f3 and transmits (forwards) the "add interface" message to the BS 120 via path f3. At S503-3, the BS 120 in turn transmits (forwards) the received "add interface" message for the interface f3 to the network gateway.

Similarly, at S503-4, the UE 102 transmits an "add interface" message to the HR 118 (this may be referred to as the HR 118 "add interface" message). At S503-5, the HR 118 replaces the IP address of HR 118 in the received HR 118 "add interface" message with the IP address of the interface for f5 and transmits (forwards) the received "add interface" message to the 135 122 via path f5. At S503-6, the BS 122 transmits (forwards) the received "add interface" message for the interface f5 to the network gateway 126.

For example and with reference to FIG. 1, the data communication path f3 may be designated as a default data communication path associated with the HR 116. Accordingly, upon reception of the "add interface" message to add. HR 116 data communication path at S503-1, the HR 116 forwards the "add interface" message for the interface f3 to the BS 120 at S503-2 to be forwarded to the network gateway 126 via the BS 120 at S503-3.

Similarly and still with reference to FIG. 1, the data communication path f5 may be designated as a default data communication path associated with the HR 118. Accordingly, upon reception of the "add interface" message to add HR 118 data communication path at S503-4, the HR 118 forwards the "add interface" message to the BS 122 via path f5 at S503-5 to be forwarded to the network gateway 126 via the BS 122 at S503-6.

In one example embodiment, S503-1 to S503-6 may collectively be referred to as S503.

At S508-1, the UE 102 receives a message from the HR 116, informing the UE 102 of additional data communication path(s) available to the HR 116. For example, the UE 102 receives a message from the HR 116 informing the UE 102 that the data communication path f4 is also available to the HR 116 and may be utilized by the UE 102.

Similarly, at S508-2, the UE 102 receives a message from the HR 118 informing the UE 102 of additional data communication path(s) available to the HR 118. For example, the UE 102 receives a message from the HR 118 informing the UE 102 that the data communication path f6 is also available to the HR 118 and may be utilized by the UE 102.

In one example embodiment, S508-1 and S508-2 may collectively be referred to as S508.

In one example embodiment, the HRs 116 and 118 may transmit the messages to the UE 102 (at S508-1 and S508-2) at the same time as forwarding the received "add interface" messages to the network gateway 126 (at S503-2, S503-3, S503-5 and S503-6), as discussed above.

Thereafter, at S513-1, the UE 102 transmits additional "add interface" message(s) for the newly discovered data communication paths at 508-1. For example, the UE 102 transmits an additional "add interface" messages for path f4, which the UE 102 was informed of by the HR 116 at S508-1. In one example embodiment, the UE 102 transmits the additional "add interface" message to the HR 116 at S513-1. Then at S513-2, the HR 116 transmits (forwards) the received additional "add interface" message to the BS 122 via path f4. At S513-3, the BS 122 in turn transmits (forwards) the received additional "add interface" message for the interface f4 to the network gateway 126.

Similarly, at S513-4, the UE 102 transmits additional "add interface" message(s) for the newly discovered data communication paths at S508-2. For example, the UE 102 transmits an additional "add interface" messages for path f6, which the UE 102 was informed of by the HR 118 at S508-2.

In one example embodiment, the UE 102 transmits the additional "add interface" message to the HR 118 at S513-4. At S513-5, the HR 118 transmits (forwards) the received additional "add interface" message to the BS 124 via path f6. Then at S513-6, the BS 124 transmits (forwards) the received additional "add interface" message for the interface f6 to the network gateway 126.

In one example embodiment, S513-1 to S513-6 may collectively be referred to as S513.

Thereafter, at S518, the process reverts back to S316 of FIGS. 3 and S316 and S321 may be repeated. FIG. 5 illustrates an example of establishing a data communication session at S316, via paths f1, f3, f4, f5 and f6 during the traffic flow phase. The process at S518 is the same as the process at S417 described above with reference to FIG. 4. In other words, steps S518-1 to S518-14 correspond to steps S417-1 to S417-14, respectively. Accordingly and for sake of brevity, S518 will not be described any further.

Figure 6:
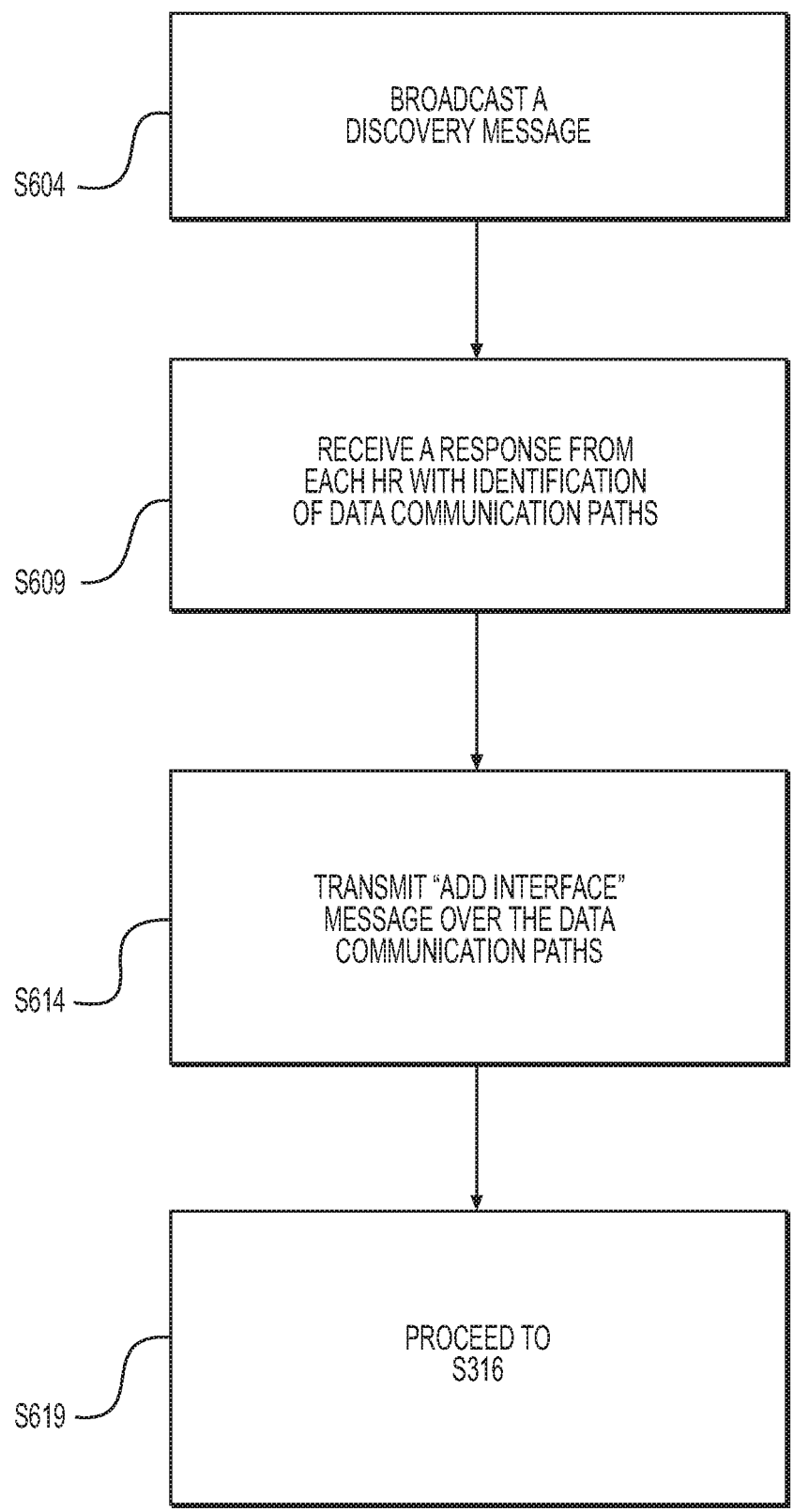
FIG. 6 illustrates a method for identifying data communication paths between a M-RAT capable UE and a network gateway, according to an example embodiment.

FIG. 6 illustrates a method for identifying data communication paths between a M-RAT capable UE and a network gateway, according to an example embodiment. With reference to FIG. 6, the UE 102 is M-RAT capable and performs network interface discovery via a broadcast message and thereafter performs network interface addition, as will be described. FIG. 6 will be described below with reference to FIGS. 1-3.

At S604, the UE 102 broadcasts a discovery message to the HRs 116 and 118.

At S609, the UE 102 receives a response from the HRs 116 and 118 identifying for the UE 102 the available data communication paths f3, f4, f5 and f6.

At S614, the UE 102 transmits an "add interface" message, as described above, over the identified data communication paths f3, f4, f5 and f6.

At S619, the process reverts back to S316 of FIG. 3 and S316 and S321 may be repeated.

Figure 7:
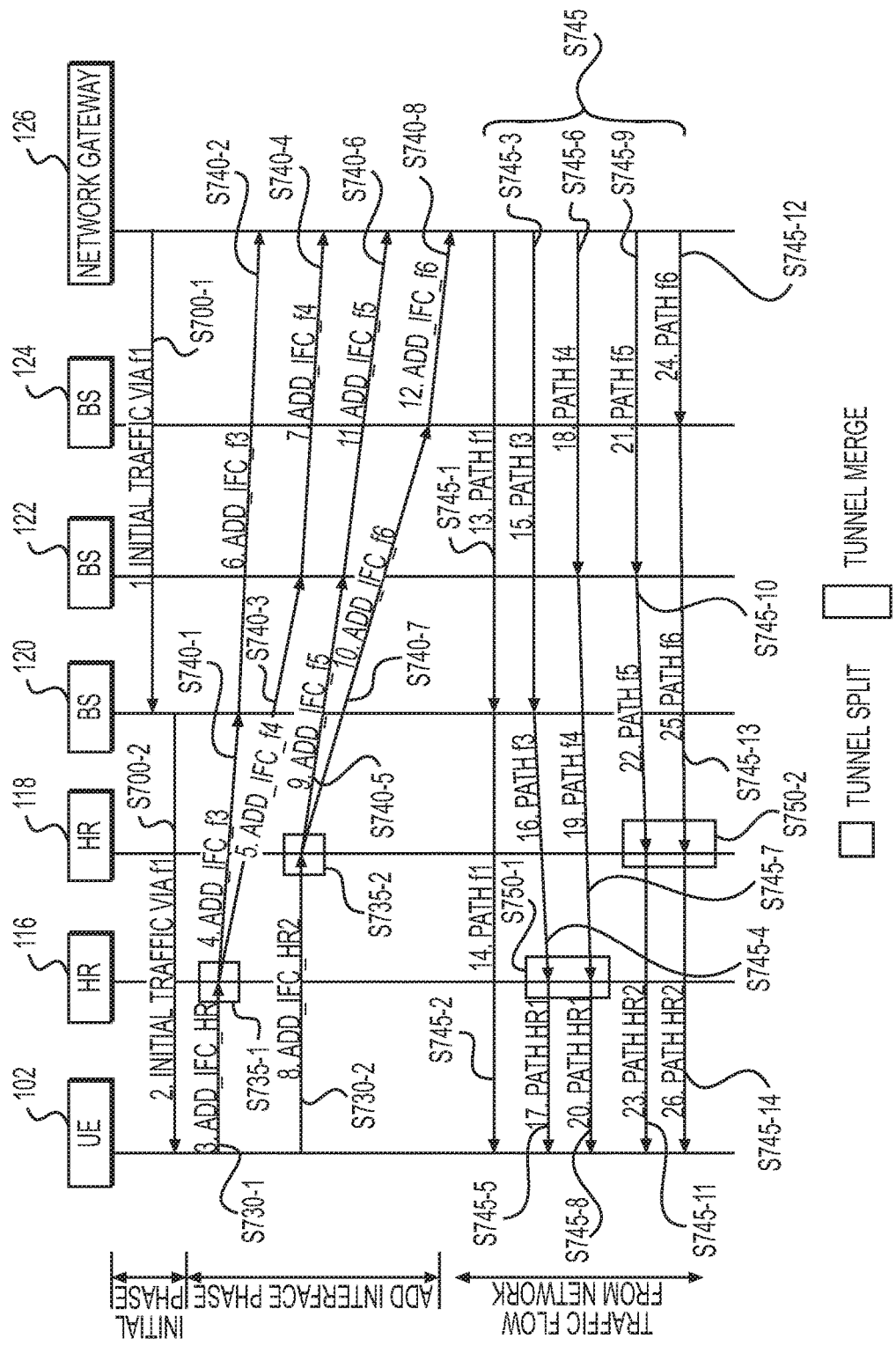
FIG. 7 illustrates a method for identifying data communication paths between a M-RAT capable UE, which is supported by a M-RAT proxy for data communication path additions, and a network gateway, according to an example embodiment.

FIG. 7 illustrates a method for identifying data communication paths between a M-RAT capable UE, which is supported by a M-RAT proxy for data communication path additions, and a network gateway, according to an example embodiment. FIG. 7 will be described below with reference to FIGS. 1-3. FIG. 7 will be described from the perspective of the HR 116 and the HR 118.

Similar to FIG. 5 and as can be seen from FIG. 7, the process of FIG. 7 is divided into an initial phase, an add interface phase and a traffic flow phase. In one example embodiment, identifying the data communication paths is performed during the add interface phase while the traffic flow is performed during the traffic flow phase.

During the initial phase, S700-1 and S700-2 is the same as S500-1 and S500-2 as described above with reference to FIG. 5. Therefore and for sake of brevity, S700-1 and S700-2 will not be described further.

During the add interface phase, at S730-1, the HR 116 receives an "add interface" message from the UE 102 (this may be referred to as the HR 116 "add interface" message). Similarly and in one example embodiment, at S730-2 the HR 118 receives an "add interface" message from the UE 102 (this may be referred to as the HR 118 "add interface" message).

In one example embodiment, S730-1 and S730-2 may be collectively referred to as S730.

At S735-1 and upon reception of the corresponding HR 116 "add interface" message, the HR 116 splits and proxies the HR 116 "add interface" message. In other words, the HR 116 replicates the received HR 116 "add interface" message and replaces the source IP address of the received HR 116 "add interface" message with the IP addresses of the data communication paths f3 and f4.

Similarly at S735-2, upon reception of the HR 118 "add interface" message, the HR 118 splits and proxies the HR 118 "add interface" message. In other words, the HR 118 replicates the received HR 118 "add interface" message and replaces the source IP address of the received HR 118 "add interface" message with the IP addresses of the data communication paths f5 and f6.

In one example embodiment, S735-1 and S735-2 may be collectively referred to as S735.

As shown in FIG. 1, the HR 116 communicates with the network gateway 126 via the BS 120 and the BS 122. Accordingly, at S740-1, the HR 116 transmits (forwards) one copy of the replicated message (with the IP address of the interface for f3 included therein) to the BS 120. Thereafter, at S740-2, the BS 120 transmits (forwards) the received copy of the replicated message to the network gateway 126.

Similarly, at S740-3, the HR 116 sends another copy of the replicated message (with the IP address of the interface for f4 included therein) to the BS 122. Thereafter, at S740-4, the BS 122 transmits (forwards) the received copy of the replicated message to the network gateway 126.

Similarly, as shown in FIG. 1, the HR 118 communicates with the network gateway 126 via the BS 122 and the BS 124. Accordingly, at S740-5, the HR 118 transmits (forwards) one copy of the replicated message (with the IP address of the interface for f5 included therein) to the BS 122. Thereafter, at S740-6, the BS 122 transmits (forwards) the received copy of the replicated message to the network gateway 126.

Similarly, at S740-7, the HR 118 sends another copy of the replicated message (with the IP address of the interface for f6 included therein) to the BS 124. Thereafter, at S740-8, the BS 124 transmits (forwards) the received copy of the replicated message to the network gateway 126.

The process at S745 is the same as the process at S417 described above with reference to FIG. 4, except as described below. In other words, S745-1 to S745-4 corresponds to S417-1 to S417-4 respectively, S745-6 and S745-7 correspond to S417-6 and S417-7 respectively, S745-9 and S745-10 correspond to S417-9 and S417-10 respectively, and S745-12 and S745-13 correspond to S417-12 and S417-13 respectively. Accordingly and for sake of brevity, S745-1 to S745-4, S745-6, S745-7, S745-9, S745-10, S745-12 and S745-13 will not be described further. However, S745-5, S745-8, S745-11 and S745-14 will be described below.

Upon reception of data packets at S745-4 and S745-7, at S750-1, the HR 116 aggregates the received data packets from the data communication paths f3 and f4. Thereafter, at S745-5 and S745-8, the HR 116 forwards the aggregated data packets to the UE 102 after replacing the IP addresses in the received data packets (received at S745-4 and S745-7) with the IP address of the HR 116 known to the UE 102.

Similarly, upon reception of data packets at S745-10 and S745-13, at S750-2, the HR 118 aggregates the received data packets from the data communication paths f5 and f6. Thereafter, at S745-11 and S745-14, the HR 118 forwards the aggregated data packets to the UE 102 after replacing the IP addresses in the received data packets (received at S745-10 and S745-13) with the IP address of the HR 118 known to the UE 102.

Figure 8:
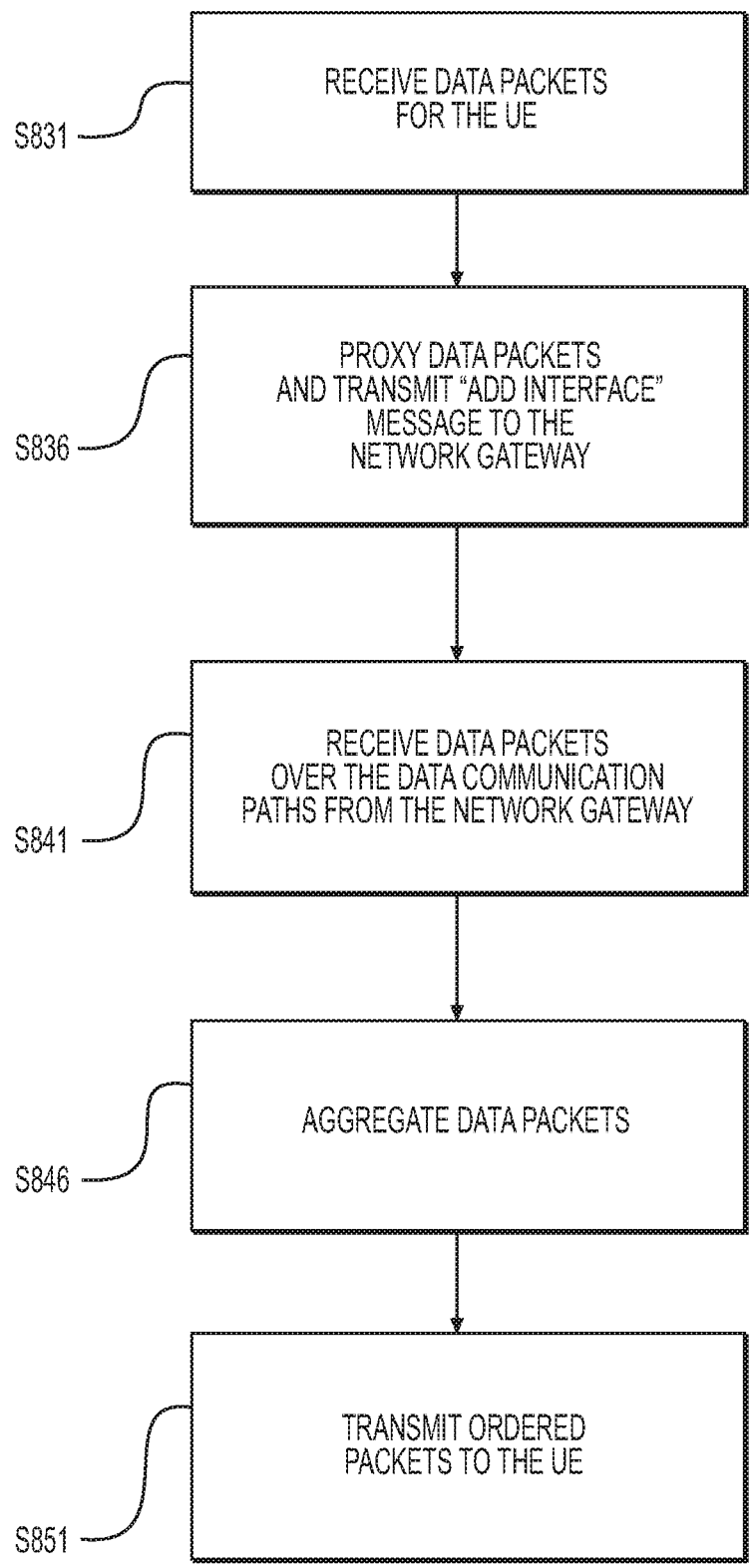
FIG. 8 illustrates a method for identifying data communication paths between a non-M-RAT capable UE connected to a proxy supplying M-RAT capabilities, and a network gateway, according to an example embodiment.

FIG. 8 illustrates a method for identifying data communication paths between a non-M-RAT capable UE connected to a proxy supplying M-RAT capabilities, and a network gateway, according to an example embodiment. FIG. 8 will be described below with reference to FIGS. 1-3. FIG. 8 will be described with reference to the UE 108 of FIG. 1, which does not have M-RAT capability.

At S831, the HR 116 and/or the HR 118 receive(s) data packets from the UE 108.

At S836 and upon reception of the packets from the UE 108, the HR 116 proxies the data packets and transmit "add interface" message, per each data communication path (e.g., paths f3 and f4 shown in FIG. 1) associated with the HR 116, to the network gateway 126.

Similarly, at S836, and upon reception of the data packets from the UE 108, the HR 118 proxies the data packets and transmit "add interface" message, per each data communication path (e.g., paths f5 and f6 shown in FIG. 1) associated with the HR 118, to the network gateway 126.

As shown in FIG. 1, the HR 116 communicates with the network gateway 126 via the BS 120 and the BS 122. Accordingly, the HR 116 sends the "add interface" message to the BS 120 (with the IP address of the interface for f3 included therein) and another copy thereof to the BS 122 (with the IP address of the interface for f4 included therein).

Similarly, as shown in FIG. 1, the HR 118 communicates with the network gateway 126 via the BS 122 and the BS 124. Accordingly, the HR 118 sends "add interface" message to the BS 122 (with the IP address of the interface for f5 included therein) and another copy thereof to the BS 124 (with the IP address of the interface for f6 included therein).

Thereafter, the BSs 120, 122 and 124 forward the messages received from the HR 116 and/or the HR 118 to the network gateway 126. Upon receiving the messages, the network gateway 126 adds f3, f4, f5 and f6 as available data communication paths for the UE 108.

At S841, the HR 116 and/or the HR 118 receive data packets from the network gateway 126 over the respective ones of the data communication paths and via the respective ones of the BSs 120, 122 and 124.

Thereafter, at S846, the HR 116 aggregates the received data packets from the data communication paths f3 and f4, and the HR 118 aggregates data packets from the data communication paths f5 and f6.

Upon aggregation of the data packets, at S851, the HR 116 and/or the HR 118 transmit the ordered data packets to the UE 108.

In the example embodiment of FIG. 8, the M-RAT aggregation process performed by the HR 116 and/or the HR 118 are hidden from the UE 108.

During transmission of data packets between the UE 102 and the network gateway 126, Robust Header Compression (ROHC) for protocol header compression may be used to minimize the level of communication overhead. Such protocol compression features enable short data payloads (e.g., for Voice over IP (VoIP)). The ROHC is supported in 3GPP, and every packet data convergence protocol (PDCP) entity uses one ROHC compression instance and one ROHC decompression instance. In LTE networks, the ROHC is performed at the PDCP layer that resides in the UEs and the eNB (e.g., the UE 102 and the BS 120).

Since example embodiments described above provide for the GRE encapsulation between a specific UE (e.g., UE 102) and a supporting gateway (e.g., the network gateway 126), the proposed dynamic GRE tunneling hides the original IP packets and other information that is above the IP layer.

The GRE packets may again be encapsulated into another IP header, referred to as an outer IP header. The PDCP layer performs ROHC compression on the outer IP packet header all the way up to the GRE header, since the GRE header is not part of the ROHC compression profiles.

In one example embodiment, the ROHC may be implemented at the PDCP layer and may be utilized in small packets traffic such as VoIP (compression of RTP/UDP/IP headers that are fairly large compared to the VoIP packet payload). The compression benefits are more limited for traffic flows utilizing full Maximum Transmit Unit (MTU) sized packets (i.e. 1460 bytes). Arguably, the small packet size traffic usually does not translate into large throughputs. Therefore, such traffic flows with higher protocol headers to data payload ratio may be ruled out of the traffic aggregation policy. Therefore, it is very likely that those traffic flows do not use a GRE tunnel and simply use a single path and thus performing ROHC would not be necessary.

Figure 9:
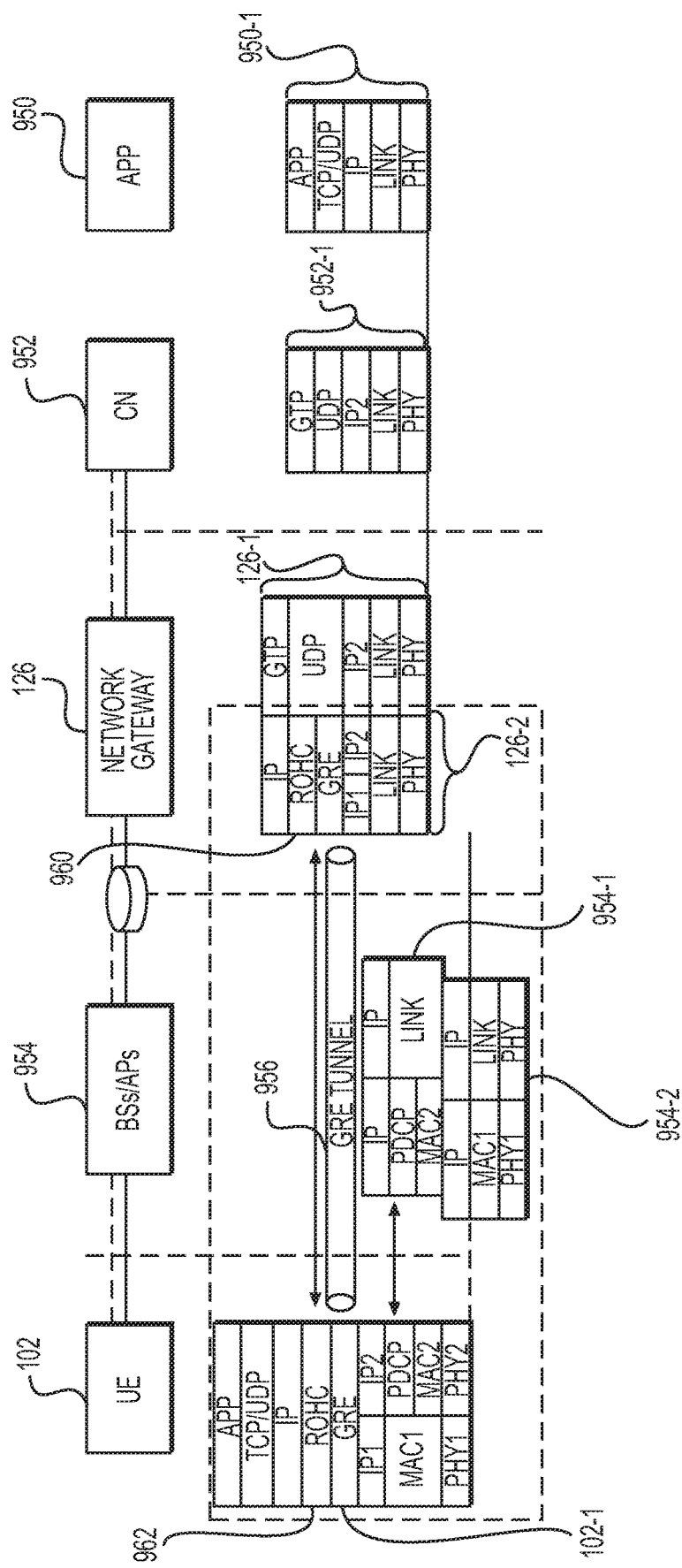
FIG. 9 illustrates a protocol layer architecture for supporting ROHC over GRE tunneling, according to an example embodiment.

In one example embodiment, the ROHC compression/decompression may be used above the GRE protocol layer at the UE 102 and the network gateway 126. FIG. 9 illustrates a protocol layer architecture for supporting ROHC over GRE tunneling, according to an example embodiment.

Similar to FIG. 2B, FIG. 9 illustrates that a data service may be established between two nodes (e.g., the UE 102 and an application server 250). Corresponding data packets may be transmitted between the UE 102 and the application server 250 via one or more intermediate nodes (e.g., a core network (CN) 252, the network gateway 126 and the BSs/APs 254). Elements 950, 950-1, 952, 952-1, 126-1, 954, 954-1, 954-2 and 956 are the same as 250, 250-1, 252, 252-1, 126-1, 254, 254-1, 254-2 and 256 of FIG. 2B, respectively. Accordingly and for sake of brevity, elements 950, 950-1, 952, 952-1, 126-1, 954, 954-1, 954-2 and 956 will not be described further.

Architectures 126-2 and 102-1 in FIG. 9, compared to architectures 126-2 and 102-1 in FIG. 2B, have the additional ROHC layers 960 and 962 (for compression and/or decompression) above the corresponding GRE layer, respectively. For example, before the GRE encapsulation, the ROHC compression on protocol headers in data packets is performed at ROHC layer 960 at the transmitter side of the network gateway 126 before transmission to the UE 102 (e.g., or alternatively at the ROHC layer 962 at the transmitter of the UE 102 before transmission to the network gateway 126) at one end of the GRE tunnel 956, and ROHC decompression is performed at ROHC layer 962 at the other terminating point of the GRE tunnel 956 at the UE 102 (e.g., or alternatively at the ROHC layer 960 at the terminating point of the GRE tunnel 956 at the network gateway 126 when the data packet is compressed at the UE 102 and sent to the network gateway 126).

This additional ROHC may ensure compression of the inner IP packet headers, while the ROHC at the PDCP layer performs header compression for the outer IP packet header. All packet headers under ROHC compression profiles are compressed.

In one example embodiment, the current ROHC compression profiles supported in the standard, (e.g., "No compression, RTP/UDP/IP, UDP/IP, TCP/IP, ESP/IP and IP headers") may be extended to support compression at the GRE/IP layers, which may in turn eliminate the ROHC functionality above the GRE layer. In order to do so, the available RATs should be configured to support a PDCP layer, because the protocol header of the IP tunnel may be compressed at the PDCP layer. In addition to the extended ROHC profile, PDCP layer should be configured to support a multi-layered ROHC compression. Such modification would allow the handling of various combinations of protocol encapsulation/tunneling. As an example, the first ROHC compresses the outer IP/GRE header, while the second ROHC compresses the inner IP packet header based on the available ROHC profiles. The two layered ROHC decompressions are performed at the other end point of the IP tunnel (e.g., one of the UE 102 and the network gateway 126 that functions as the receiving end of data packets).

While example embodiments have been described with reference to M-RAT enabled devices such as the UE 102, inventive concepts are not limited thereto. Accordingly, single RAT enabled devices may also operate within the system 100 and utilize the plurality of data communication paths over the multiple RATs (e.g., the Wi-Fi and the 4G-LTE systems) for establishing data transmission sessions with the network gateway and receive data packets through the plurality of data communication paths.

Furthermore, while example embodiments above describe a traffic flow of data from the network gateway 126 to the UE 102, inventive concepts are not limited thereto. The plurality of data communication paths may also he utilized for uplink communication from the UE 102 to the network gateway 126 in the same fashion as described above for downlink transmission from the network gateway 126 to the UE 102.

Variations of the example embodiments are not to he regarded as a departure from the spirit and scope of the example embodiments, and all such variations as would be apparent to one skilled in the art are intended to he included within the scope of this disclosure.

What is claimed:

1. A device comprising:
    a memory having computer-readable instructions stored therein; and
    a processor configured to execute the computer-readable instructions to identify a plurality of communication paths for data transmission of a data service between the device and a network gateway, wherein the processor is configured to execute the computer-readable instructions to,
        identify the plurality of communication paths by
            transmitting a message to at least one intermediate network node via a first communication path to add an interface for the data service, the first communication path being associated with a first radio access technology, the message being a first add interface message for the at least one intermediate network node to forward the first add interface message to the network gateway over a default communication path associated with the at least one intermediate network node, the first add interface message identifying the default communication path for the network gateway,
            receiving an identification message from the at least one intermediate network node identifying one or more communication paths available to the at least one intermediate network node, the one or more communication paths including a second communication path of the plurality of communication paths, the second communication path being associated with a second radio access technology, and the first communication path and the one or more communication paths forming the plurality of communication paths to be used simultaneously for the data service, the identification message identifying at least one additional communication path associated with the at least one intermediate network node, and
            transmitting a second add interface message to the at least one intermediate network node for the at least one intermediate network node to forward the second add interface message to the network gateway, the second add interface message identifying the at least one additional communication path for the network gateway; and
        set a first fraction of a traffic flow for the first communication path and a second fraction of the traffic flow for the second communication path, the first fraction and the second fraction being set based upon at least one of,
        bandwidth of the first communication path and the second communication path, or
        packet delay reports for the first communication path and the second communication path,
        the device being simultaneously in transmission with the network gateway via at least one base station, including splitting the traffic flow into the first fraction transmitted over the first communication path of the plurality of communication paths and the second fraction simultaneously transmitted over the second communication path of the plurality of communication paths.

2. The device of claim 1, wherein the data transmission is associated with a single data service for the device.

3. The device of claim 1, wherein the processor is configured to execute the computer-readable instructions to broadcast the message during a dynamic host configuration process upon activation of the device.

4. The device of claim 1, wherein the processor is configured to execute the computer-readable instructions to establish a data transmission session by,
    transmitting an add interface message to the network gateway identifying for the network gateway, the one or more identified communication paths of the plurality of communication paths,
    at least one of receiving during a downlink transmission, and transmitting during an uplink transmission, data packets each including a different portion of data associated with the data transmission session over each of the plurality of communication paths.

5. The device of claim 4, wherein during the downlink transmission of the data packets, the processor is configured to execute the computer-readable instructions to,
    aggregate the data packets to reconstruct the data, and
    decompress protocol headers in the data, the protocol headers having been compressed at the network gateway prior to transmission over the plurality of communication paths to the device, wherein compression and decompression of the protocol headers in the data packets are based on Robust Header Compression.

6. The device of claim 4, wherein during the uplink transmission of the data packets, the processor is configured to execute the computer-readable instructions to compress protocol headers in the data packets to be transmitted to the network gateway, the protocol headers being decompressed at the network gateway upon receipt, wherein compression and decompression of the protocol headers in the data packets are based on Robust Header Compression.

7. The device of claim 4, wherein the add interface message is transmitted to the network gateway via the at least one intermediate network node and a corresponding base station associated with one of at least two different radio access technologies.

8. The device of claim 1, wherein
    the processor is configured to execute the computer-readable instructions to establish data communication between the device and the network gateway via the first communication path associated with the device, prior to transmitting the first add interface message.

9. The device of claim 1, wherein the processor is configured to execute the computer-readable instructions to establish a data transmission session by,
    at least one of receiving during a downlink transmission, and transmitting during an uplink transmission, data packets each including a different portion of data associated with the data transmission session over each of the plurality of communication paths.

10. The device of claim 9, wherein during the downlink transmission of the data packets, the processor is configured to execute the computer-readable instructions to,
    aggregate the received data packets to reconstruct the data, and
    decompress protocol headers in the data, the protocol headers having been compressed at the network gateway prior to transmission over the plurality of communication paths to the device, wherein compression and decompression of the protocol headers in the data packets are based on Robust Header Compression.

11. The device of claim 9, wherein during the uplink transmission of the data packets, the processor is configured to execute the computer-readable instructions to compress protocol headers in the data packets to be transmitted to the network gateway, the protocol headers being decompressed at the network gateway upon receipt, wherein compression and decompression of the protocol headers in the data packets are based on Robust Header Compression.

12. The device of claim 1,
wherein the transmitting a message to at least one intermediate network node includes broadcasting at least one discovery message, and
wherein the receiving an identification message from the at least one intermediate network node includes receiving at least one response to the at least one discovery message with information about available communication paths, the at least one of the plurality of communication paths being a dedicated communication path associated with the device.

13. The device of claim 11, wherein
at least the first communication path is associated with a first technology according to which the device communicates with the network gateway, and
at least the second communication path is associated with a second technology according to which the device communicates with the network gateway.

14. A device comprising:
a memory having computer-readable instructions stored therein; and
a processor configured to execute the computer-readable instructions to
establish a plurality of communication paths to be used simultaneously for data transmission of a data service between a user equipment (UE) and a network gateway, by
receiving a message via a first communication path to add an interface for the data service, the message being a first add interface message identifying a default communication path for the network gateway,
transmitting an identification message identifying one or more communication paths available to the device and to be used simultaneously with the first communication path for the data service, the one or more communication paths including a second communication path, and the first communication path and the one or more communication paths forming the plurality of communication paths, the identification message identifying at least one additional communication path, and
receiving a second add interface message identifying the at least one additional communication path for the network gateway; and
set a first fraction of a traffic flow for the first communication path and a second fraction of the traffic flow for the second communication path, the first fraction and the second fraction being set based upon at least one of,
bandwidth of the first communication path and the second communication path, or
packet delay reports for the first communication path and the second communication path,
the UE being simultaneously in transmission with the network gateway via at least one base station over the plurality of communication paths, including splitting the traffic flow into the first fraction transmitted over the first communication path of the plurality of communication paths and the second fraction simultaneously transmitted over the second communication path of the plurality of communication paths.

15. The device of claim 14, wherein the processor is configured to execute the computer-readable instructions to,
receive a request message from the UE, the request message being a request by the UE to establish a communication path to the network gateway via the device,
create a number of copies of the request message, the number of copies corresponding to a number of communication paths available between the device and the network gateway, each of the copies being a modified version of the request message having an IP address of one of the number of communication paths, and
transmitting each of the number of copies to the network gateway in order to establish the plurality of communication paths for the data transmission between the UE and the network gateway.

16. The device of claim 15, wherein the processor is configured to execute the computer-readable instructions to establish a data transmission session by,
receiving different portions of data via each of the plurality of communication paths from the network gateway, each different portion having been compressed at the network gateway,
aggregating the different portions of the data, and
transmitting aggregated portions to the UE.

17. The device of claim 14, wherein
the UE is configured to operate according to one radio access technology, and
the processor is configured to execute the computer-readable instructions to,
receive a data packet from the UE,
transmit a number of add interface messages to the network gateway, the number of add interface messages corresponding to a number of the plurality of communication paths between the device and the network gateway, and
establish the plurality of communication paths upon reception of the number of add interface messages by the network gateway.

18. The device of claim 17, wherein the processor is configured to execute the computer-readable instructions to establish a data transmission session by,
receiving a different portion of the data via each of the plurality of communication paths,
performing data packet aggregation on the received different portions to reconstruct the data, and
transmitting the reconstructed data to the UE.

* * * * *